Aug. 12, 1958  V. A. GALLOWAY  2,847,135
VEHICLE LOADER
Filed Oct. 1, 1954  3 Sheets-Sheet 3
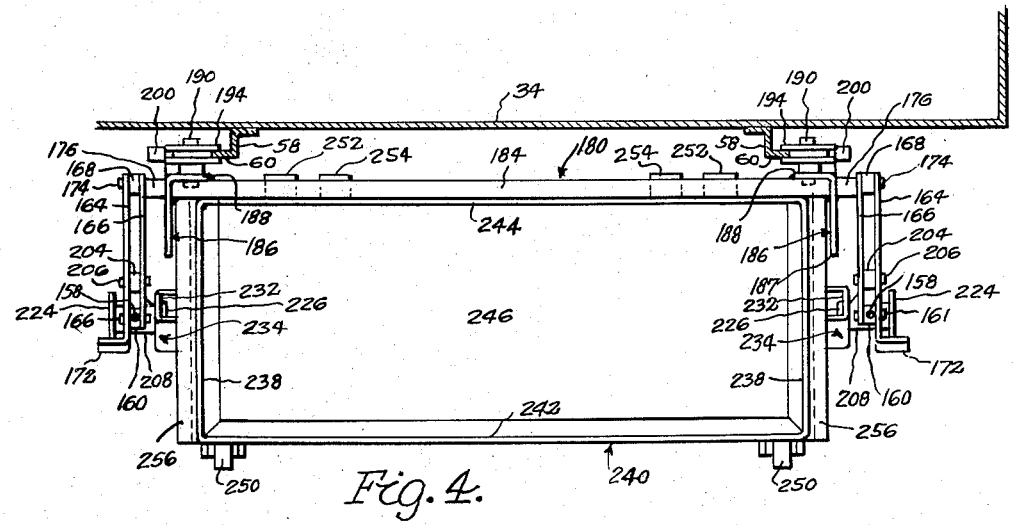
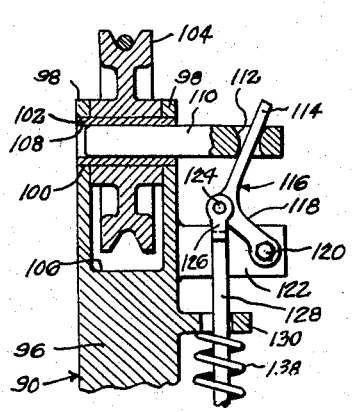
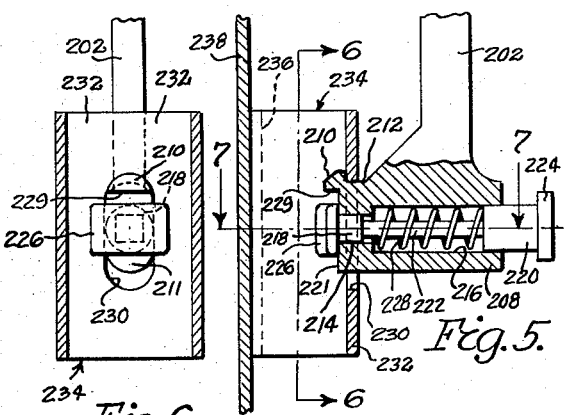
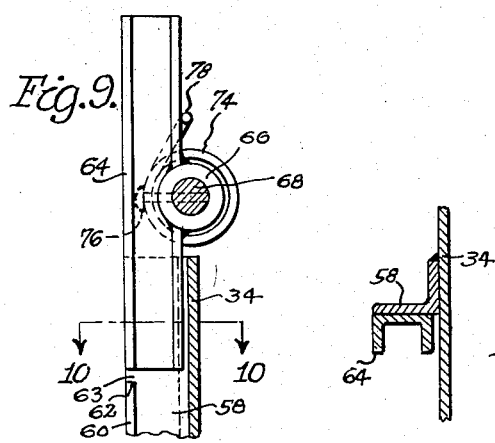
INVENTOR.
Victor A. Galloway
BY Barthel + Bugbee
Attys

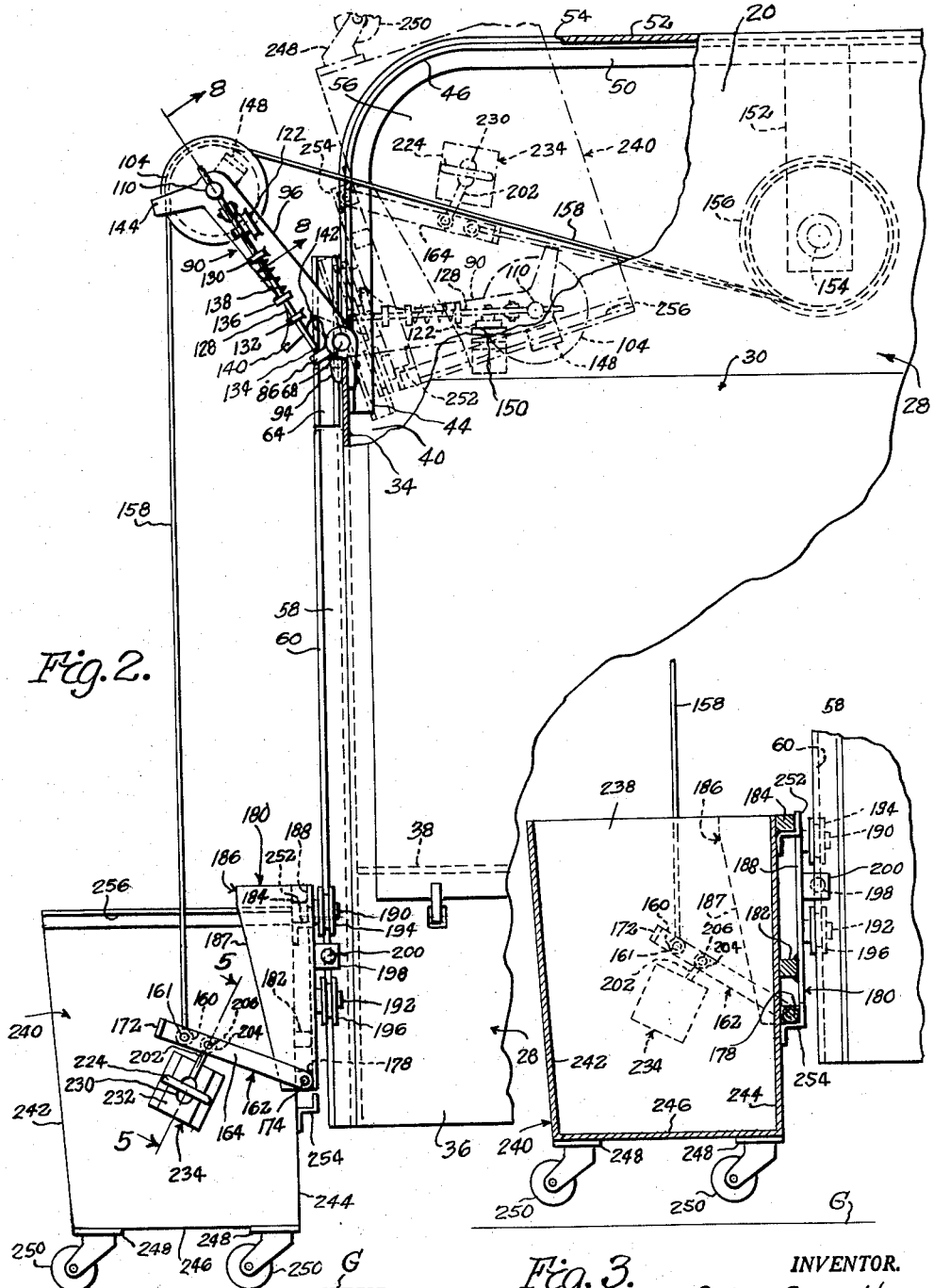

United States Patent Office 2,847,135
Patented Aug. 12, 1958

2,847,135

VEHICLE LOADER

Victor A. Galloway, St. Clair Shores, Mich.

Application October 1, 1954, Serial No. 459,614

19 Claims. (Cl. 214—302)

This invention relates to vehicle loaders and, in particular, to vehicle loaders for loose materials.

One object of this invention is to provide a vehicle loader for loose materials wherein the materials, such as trash, garbage, dirt, chemicals, food wastes, agricultural or vegetable materials, industrial scrap or the like, is collected in portable containers which is picked up bodily, elevated, and tilted to empty their contents into the interior of a truck or other vehicle, whereupon the container is lowered to its starting position and detached for further use while the truck proceeds on its journey to pick up materials from other similar containers on its route or, when fully loaded, to proceed to the unloading destination thereof.

Another object is to provide a vehicle loader of the foregoing character wherein the containers are of tapered shape and have removable covers so that they may be nested for shipment or for storage during periods of temporary non-use, thereby economizing in the space necessary to accommodate them at the place of utilization.

Another object is to provide a vehicle loader of the foregoing character wherein the container is automatically locked to the elevator by a container retaining device disposed therebetween while it is being hoisted and emptied, thereby preventing accidental detachment or displacement of the container relatively to the elevator, and automatically unlocked when the container is lowered to its starting position and detached.

Another object is to provide a vehicle loader of the foregoing character wherein means is provided for quickly yet positively attaching the container to the hoisting mechanism and detaching it from the hoisting mechanism at the beginning and end of the emptying operation, so that there is at no time any danger of inadequate support for the container, however heavily loaded it may be.

Other objects and advantages of the invention will become apparent during the course of the following description of the accompanying drawings, wherein:

Figure 2 is a rearward end elevation of the vehicle shown in Figure 1, with the loader in side elevation;

Figure 3 is a vertical cross-section through the container and elevator taken along the line 3—3 in Figure 1;

Figure 4 is a horizontal section taken along the line 4—4 in Figure 1, showing the container and elevator in top plan view;

Figure 5 is an enlarged inclined fragmentary section taken along the line 5—5 in Figure 2, showing the quick-detachable coupling between the container and the hoisting mechanism of the elevator;

Figure 6 is a vertical section taken along the line 6—6 in Figure 5;

Figure 7 is an inclined approximately horizontal section taken along the line 7—7 in Figure 5;

Figure 8 is an inclined fragmentary section taken along the line 8—8 in Figure 2, showing the automatic container locking pin mechanism;

Figure 9 is a vertical section taken along the line 9—9 in Figure 1, showing the tilting rail for temporarily supporting the elevator and container during emptying; and Figure 10 is a horizontal section taken along the line 10—10 in Figure 9.

Figure 1:
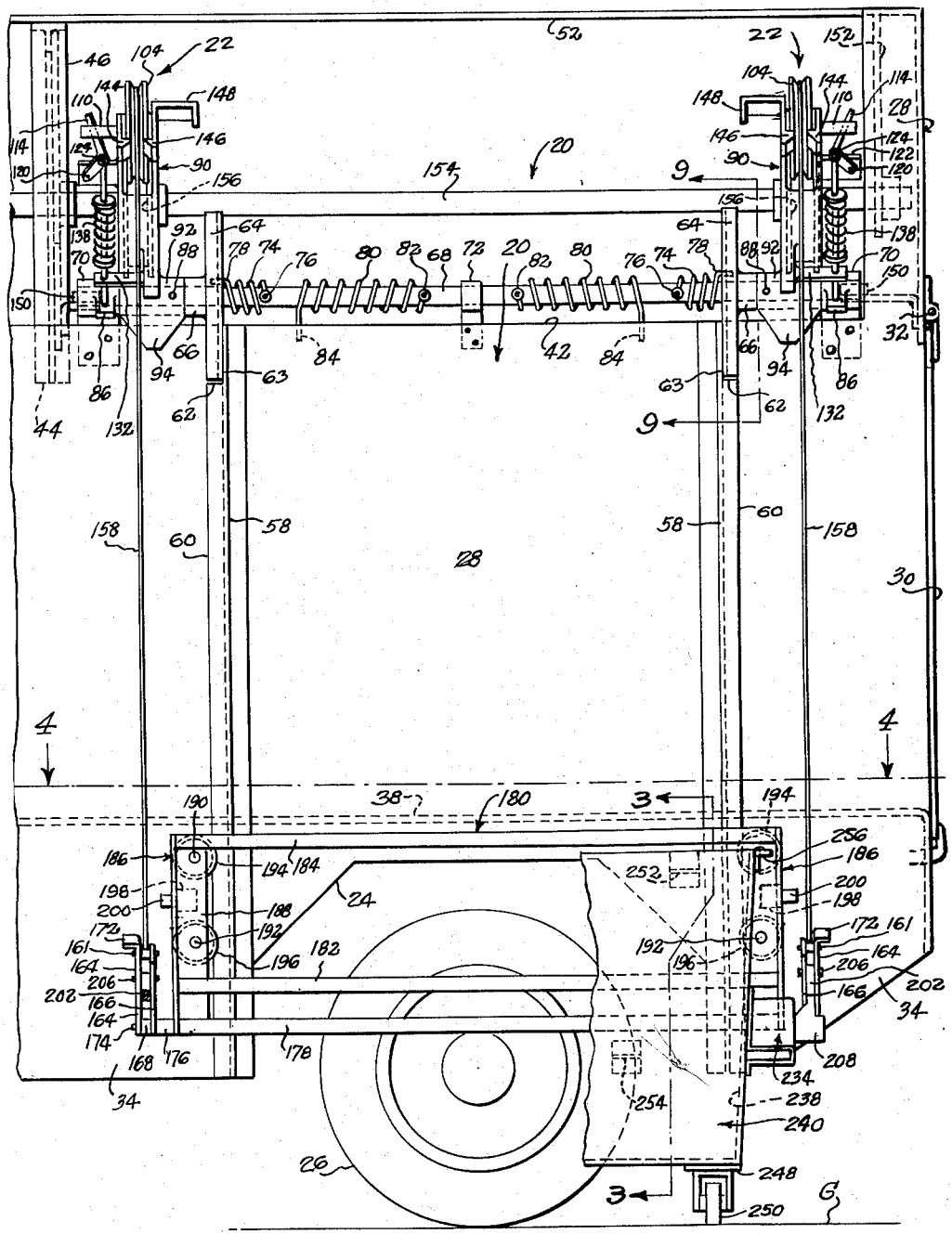
Figure 1 is a side elevation of the rearward portion of a vehicle equipped with the material loader of the present invention with part of the detachable container omitted to disclose the elevator structure behind it, the loader being in front elevation.

Hitherto, materials such as trash, garbage, dirt, chemicals, food wastes, agricultural or vegetable materials, industrial scrap or the like has been collected in cans or barrels which are then moved to the curb or loading zone of the store, factory or other establishment, and picked up bodily by hand and emptied of their contents into dump trucks or other vehicles by which the materials are conveyed to a place of disposal, such as a dump or processing plant. In order to facilitate picking up and loading these materials, various specialized vehicles with different types of loaders have been developed, so as to minimize the height to which the barrel, can or drum must be raised in order to transfer its contents to the vehicle. In the previous United States patents to Galloway et al., 2,522,441 of September 10, 1950, and to Galloway, 2,674,384 of April 6, 1954, both for Vehicle Loading Equipment, I have disclosed and claimed two types of such vehicles. These employ loading mechanism with permanently attached buckets which are lowered along guide rails to a location near the ground level at the side of the vehicle, requiring the user to lift the cans, barrels or drums of material only a short distance in order to transfer their contents to the buckets. The buckets are then hoisted to the top of the vehicle body, tilted to empty them of their contents, and returned to their starting positions for an additional load.

In such prior material loading vehicles, however, it has still been necessary for the workman or user of the vehicle to manually lift the cans, drums or barrels in order to transfer their contents to the loader buckets. Such cans, drums or barrels are of limited capacity, yet are heavy and unwieldly to handle. Consequently, this arrangement requires a considerable physical exertion for its employment, even though the subsequent elevating or hoisting and emptying are done by power-driven mechanism. The manual lifting of the drums or other containers in order to dump their contents into the bucket is also an unpleasant and frequently dirty task.

The present invention completely eliminates these disadvantages of prior vehicle loaders by dispensing with the permanently-attached buckets and instead employing an elevator to which portable containers can be temporarily connected. These containers are left at the establishments served by the vehicle, where they are filled with the materials to be transported. When the containers are full or on the established collection day, they are moved to the curb, loading dock or other place of collection, the containers being preferably provided with wheels or casters for this purpose.

When the collection truck arrives, its operator pushes the container against the elevator on the side of the truck to interengage them, connects the hoisting mechanism to the container, and starts the hoisting mechanism in operation. The latter causes the elevator and the attached container to ascend to the top of the truck body, then to become automatically locked together while this assembly is inverted over the interior of the body to empty the contents of the container into the body. The hoisting mechanism is then reversed, causing the container and elevator to be reverted into their upright positions while they are swung backward over the side of the truck body and lowered to the ground, the automatic lock which temporarily locks the container to the arm during inversion being automatically released at the time the container and elevator start to descend. The operator thus disconnects the hoisting mechanism, unhooks the container from the elevator and pushes the container aside. Other containers at that location can be hoisted and emptied in the same manner yet returned immediately to their original duties of receiving further material as the truck proceeds on its collection route. In this manner no physical labor is required in raising containers or dumping them into buckets, nor are the containers themselves transported by the truck to the place of disposal, as required in other prior material-collecting vehicles. Moreover, the present containers are preferably tapered so that they are conveniently nested during transportation or storage, thereby further conserving space. The containers are likewise provided with hinged covers which are instantly opened and latched out of the way when the container is about to be hoisted and dumped.

Referring to the drawings in detail, Figures 1 to 4 inclusive show a material-loading vehicle, generally designated 20, equipped with a material loader, generally designated 22, according to the invention. The vehicle 20, aside from the loader 22, is shown as conventional as including a chassis 24 equipped with the usual rubber-tired wheels 26, only the rear wheels being shown. Mounted on the chassis 24 is a material-receiving body 28 equipped with a rear door 30 hinged at 32 to the remainder of the body 28, the lower portion of which is provided with downwardly-extending side and rear walls 34 and 36 respectively which extend close to the ground level G below the bottom 38 of the body 28 forming the bottom of the material-receiving compartment 40 into which the materials to be collected are dropped. The collection body 28 is reinforced in the usual manner, such reinforcing members being for the most part omitted in order to simplify the drawings. Secured to the upper portions of the opposite sides 34, however, near the upper edges 48 thereof are the lower ends 44 of approximately U-shaped angle members or top bows 46 on the horizontal upper portion 50 of which a roof 52 is mounted (Figure 2). The lateral edges 54 of the roof 52 are spaced inward from the plane of the side walls 34 so as to leave openings 56 through which the compartment 40 may be filled with the materials being collected. Suitable covers (not shown) of rounded angle cross-section may be provided, if desired, in order to provide further coverage of the open upper portions 56 of the body 28, if desired. These covers have been omitted because they are not essential to the operation of the loading mechanism.

Secured to the opposite side walls or side panels 34 of the body 28 in spaced parallel relationship are vertically-disposed guide rails 58. These are shown as Z-section rails (Figure 4), but it will be obvious that rails of channel or other section may also be used for the same purpose. The rails 58 are provided with wheel flanges 60 which terminate as at 62 below the upper edges 42 of the body side walls 34 (Figure 1) in cutaway portions 63 and immediately above them are mounted aligned swinging or tilting stub rails 64 connected to hubs 66 (Figures 1 and 9). The lower ends of the stub rails 64 fit into the cutaway portions 63 and the stub rails 64 are preferably of channel cross-section (Figure 10).

The hubs 66 of the stub rails 64 are loosely and rotatably mounted on rotatable shafts 68 on opposite sides of the vehicle. The opposite ends and midportions of the shafts 68 are rotatably mounted in bearing brackets 70 and 72 respectively bolted or otherwise secured to the body side walls 34 near the upper edges 42 thereof. Coil springs 74 (Figure 9) having their opposite ends secured at 76 and 78 respectively in each shaft 68 and stub rail 64 respectively urge the lower ends of the stub rails 64 into the cutaway portions or notches 63 so as to maintain the lower ends of the stub rails 64 in yielding alignment with the wheel flanges 60 of the fixed vertical guide rails 58.

Each shaft 68 is also urged in a counterclockwise direction, looking from its right-hand end toward its left-hand end in Figure 1, by coil springs 80, each of which is secured at its opposite ends as at 82 and 84 to the shaft 68 and vehicle body side wall 34 respectively adjacent the upper edge 42 thereof. Each of the bearing brackets 70 for the outer ends of each shaft 68 is provided with an integral downwardly-inclined projection or stop 86 for the purpose of automatically operating a container-locking bolt, as explained below. Pinned or otherwise fixedly secured as at 88 to the opposite ends of each shaft 68 immediately inside the end bearing brackets 70 are swinging arms 90 having hubs 92 with stop tongues or projections 94 on the lower ends thereof (Figures 1 and 2) so positioned as to engage the vehicle body side walls 34 adjacent the upper edge 42 thereof when the arms 90 are disposed in an outwardly inclined position (Figure 2).

Each arm 90 has a lever portion 96 secured to the hub 92 and preferably integral therewith, each lever portion 96 at its upper end being forked (Figure 8) to provide spaced parallel portions 98 bored as at 100 to receive a tubular axle 102 upon which a grooved pulley 104 is rotatably supported within the notch 106 located in the fork between the spaced parallel portions 98. The tubular axle 100 has a bore 108 in which a lock bolt 110 is reciprocably mounted. The lock bolt 110 is provided with a flared hole 112 which is engaged by one arm 114 of a bent lever 116, the other arm 118 of which is pivoted at 120 to a lug 122 projecting laterally from the lever portion 96 of the arm 90. Pivoted at 124 to the meeting point of the two arms 114 and 118 is the yoked upper end 126 of a reciprocable push rod 128 which passes downward through spaced apertured laterally-projecting lugs 130 and 132 on the arm 90 (Figure 2).

Secured to the push rod 128 near the lower lug 132 is a spring abutment collar 136 engaged by the lower end of a compression spring 138, the upper end of which engages the upper apertured lug 130. As a consequence, when the arm 90 is in its forwardly-inclined position (Figure 2), the engagement of the push rod 128 with the stop 86 swings the bent lever 116 (Figure 8) clockwise around its pivot 120 to reciprocate the lock bolt 110 into its retracted position, compressing the spring 138 which normally projects the bolt 110 from the tubular axle 102.

Immediately below the lower lug 132 each arm 90 is provided with a projection or deflector 140 terminating at its inner end in a notch 142 located a short distance above its pivot axis on the shaft 68. Near the upper end of each arm 90 on opposite sides of the pulley 104 this arm 90 is provided with a pair of cable guide fingers 144 and 146 projecting forward and having inwardly-bevelled ends. The inner guide finger 146 extends rearwardly and upwardly behind the axle 102 and terminates in a transversely-extending hook portion 148. Fixedly mounted within the vehicle body 28 adjacent each arm 90 in its rearwardly-located or horizontal position (Figure 2) is a fixed stop 150 of angle or L-shaped form which is located at the same radius from the axis of the shaft 68 to engage the lug 122 so as to limit the rearward swinging of each arm 90.

Secured to and depending from the top 52 of the vehicle body 28, or from the structural support thereof, are spaced bearing brackets 152 in which a rotary shaft 154 is journaled. Mounted on the shaft 154 in line with each pulley 104 is a winding drum or windlass 156. Since there are loading mechanisms on both sides of the vehicle 20, there are two shafts, 154 and two sets of winding drums 156, only one shaft 154 being shown in the drawings. The shafts 154 and their winding drums 156 are rotated by conventional mechanism outside the scope of the present invention, such as by an electric or hydraulic motor through reduction gearing, suitable mechanism for this purpose being shown in my above-mentioned Patents 2,522,441 of September 12, 1950, and 2,674,384 of April 6, 1954, both for Vehicle Loading Equipment.

Secured at one end to each of the winding drums 156 and wound therearound is a flexible cable 158 which is trained around the pulley 104 (Figure 2) and extends downwardly to an anchorage on a pivoted spacer block 160 bolted at 161 to a hoisting arm or cable attachment member 162 of the hoisting mechanism and including a pair of spaced parallel outer and inner links 164 and 166 (Figure 4) held together against opposite sides of the spacer blocks 160 and 168 respectively. The outer end of the outer link 164 has a perpendicularly-bent handle portion or finger 172 extending outwardly therefrom. A pivot stud or shaft 174 passes through links 164 and 166 and the spacer block 168 and also through a second spacer block 176 into one end of the lower frame member 178 of an elevator, generally designated 180.

The elevator 180 includes an intermediate frame member 182 and an upper frame member 184 (Figure 1) disposed parallel to one another and welded or otherwise secured at their outer ends to a pair of angle plates 186 having approximately trapezoidal sides 187 which are wider at their top edges than at their bottom edges (Figure 2), and approximately rectangular backs 188 (Figure 4). The frame members 178, 182 and 184 are preferably rectangular in cross-section and disposed substantially in the same vertical plane (Figure 3). Secured to the backs 188 of the angle plates 186 are stub shafts 190 and 192 upon which grooved wheels 194 and 196 are rotatably mounted with their grooved portions engaging the flanges 60 of the vertical guide rails 58. Also secured to the backs 188 of the plates 186 between the wheel shafts 190 and 192 base blocks 198 from which pintle pins 200 project outwardly in opposite directions. Each hoisting arm 162 also includes a swinging container coupling device 202, the hub 204 of which is pivotally mounted on a pivot pin 206 extending between the links 164 and 166.

The lower end of each swinging container coupling device 202 terminates in an enlargement or head 208 having a lateral bevelled hook portion 210 on the end 211 thereof (Figures 5 and 6) located adjacent a notch 212. The enlargement 208 is provided with aligned transverse bores 214 and 216 in which are reciprocably mounted the enlargements 218 and 220 on a plunger 222. The plunger 222 at its outer end carries a crossbar handle 224 and at its inner end an elongated rectangular latch piece 226. A compression spring 228 mounted in the larger diameter bore 216 engages the enlargement 220 so as to urge the plunger 222 outward (Figures 5 and 7). The latch piece 226 is of such length that it swings approximately into alignment with the hook portion 210 in one position, and into a recess 229 beneath the hook portion 210 in its opposite position at right angles thereto (Figure 5).

The hooked portion 210 and end 211 of the head 208 are of elongated outline (Figure 6) shaped to pass through an elongated hole 230 in the outer wall 232 of a pair of oppositely-facing brackets 234 of approximately U-shaped cross-section with attachment flanges 236 (Figure 7) by which they are welded, bolted or otherwise secured to the downwardly-inclined opposite end walls 238 of a material container, generally designated 240, in inclined positions (Figure 2). The container 240 has a downwardly-inclined front wall 242, a vertical rear wall 244 and a bottom wall 246, all being preferably made from steel plates welded together. Welded or otherwise secured to the bottom wall 246 are the bases 248 of caster wheels 250, and to the rear wall 244 two laterally-spaced pairs of upper and lower coupling hooks 252 and 254 respectively so located as to hook beneath the frame members 184 and 178 respectively of the elevator 180 and together constituting a container retaining device. Welded to the opposite end walls 238 at their upper edges are outwardly-facing angle bars 256. The top of the container 240 is normally closed by a cover (not shown) hinged to the upper edge of the wall 242.

In the operation of the invention, let it be assumed that a container 240 has received its load of trash or other material which it is intended to hold and has been moved to a suitable loading station where the vehicle 20 can pick it up. When the vehicle arrives at the loading station, the vehicle operator opens the container cover (not shown) and operates the mechanism to rotate the shaft 154 in a clockwise direction, causing the arms 90 stub rails 64 and elevator 180 thereon to swing outward in response to the thrust of the springs 80 and 74 into the positions shown in Figures 1 and 2. At the same time, the unwinding of the cables 158 from the drum 156 causes the elevator 180 to move downward from the now vertical stub rails 64 along the stationary vertical rails 58 to its loading position near the ground level G (Figures 1 to 4 inclusive). The operator then pushes the container 240 toward the elevator 180, until the upper and lower hooks 252 and 254 of the container retaining device are placed beneath the elevator cross members 184 and 178 respectively thereof (Figure 2), if necessary raising or lowering the elevator 180 in order to do so.

The operator now grasps the handles 172 and 224 of the hoisting arms 162, which are in their raised positions, and swings them downward one by one until the plunger 222 on the handle 224 of each container coupling device 202 comes into alignment with the elongated hole 230 in each of the brackets 234. Turning the handle 224, if necessary, until the elongated latch piece 226 swings into alignment with the elongated hole 230, he hooks the hook portion 210 of the head 208 into the hole 230 so that the upper edge thereof rests in the notch 212. At the same time, he pushes inward on the handle 224 to pass the latch piece 226 through the hole 230, thereupon turning the handle 224 to place the latch piece 226 transversely across the hole 230 (Figures 5, 6 and 7). This procedure locks the hoisting arms 162 to the container brackets 234.

The operator now reverses the winding mechanism to rotate the shaft 154 in a counterclockwise direction, causing the cables 158 to wind upon the winding drums 156 so that the hoisting arms 162 rise, hoisting the container 240 and its wheels 250 off the ground and thereby bringing the upper and lower hooks 252 and 254 into interlocking engagement with the upper and lower elevator frame cross members 184 and 178 respectively (Figure 3). The elevator 180 and container 240, thus interlocked rise, and they continue to rise until the pintle pins 200 engage the notches 142 in the arms 90 after the wheels 194 and 196 have passed upward from the stationary guide rails 58 onto the stub rails 64. As the pintle pins 200 engage the notches 142 (Figure 2), the elevator 180 halts in its vertical motion and pivots around the notches 142 as the continued winding of the cables 158 upon the cable drums 156 continues to pull upward on the hoisting arms 162. This procedure causes the hoisting arms 162 to swing the container 240 upward and inward while the arms 90 also swing inward toward the vehicle body 28, rotating the shaft 68 clockwise. The continued pull upon the cables 158 by their cable drums 156 also causes the stub rails 64 to swing in a clockwise direction, the rotation of the shaft 68 and the swinging of the stub rails 64 winding up the springs 80 and 74.

Meanwhile, as the arms 90 swing inward in a clockwise direction, the lower ends 134 of their push rods 128 move away from the stationary projections or stops 86, whereupon the push rods 128 are pushed downward by their respective compression springs 138 (Figure 8), causing the bell crank levers 116 to swing around their pivots 120 in such a manner as to push the lock bolts 110 inward along the bores 108 of the tubular axles 102, thereby causing the bolt 110 to be projected beneath the adjacent angle member 256 at its end of the container 240. In consequence, the container 240 is now locked firmly to the arms 90 while the angle members 256 at the top edge thereof engage the hook portions 148 of the arms 90.

The continued pull upon the cables 158 by the winding drums 156 and the continued swinging inward of the arms 90 causes the container 240 to move into the inverted position shown in dotted lines in Figure 2, until the lugs 122 move into engagement with the stops 150 on the vehicle body 28. This prevents further downward movement of the arms 90 and container 240. The force of gravity, however, aided by the jolt imparted to the container 240 when the arm lugs 122 are halted by the stops 150, forcibly expels the materials from the container 240, which is thus emptied of its load. The materials, thus expelled, drop downward into the bottom portion of the vehicle body 28, coming to rest upon the bottom wall 38 thereof. The operator then operates the controls of the hoisting mechanism to reverse the direction of rotation of the shaft 154, so as to cause the winding drums 156 to rotate clockwise, unwinding the cables 158.

The unwinding of the cables 158 now permits the wound-up springs 74 and 80 (Figure 1) to come into play, swinging the stub rails 64 and hoisting arms 90 in counterclockwise directions around their pivot shaft 68, thereby swinging the container 240 from its inverted dotted line position (Figure 2) into a position outboard of the vehicle body 28. The hoisting arms 90 swing outward until their stop tongues or projections 94 engage the vehicle body side walls 34 and bring the arms 90 to a halt. Meanwhile, the engagement of the lower ends 134 of the push rods 128 with the fixed projections 86 causes the push rods 128 to be pushed upward as the arms 90 continue to swing outward, compressing the springs 138 while they swing the bell crank levers 116 and lock bolts 110 outward, releasing the latter from their locking engagement with the angle members 256 at the opposite ends of the container 240.

The continued unwinding of the cables 158 thereafter causes the elevator 180 to descend from the stub rails 64 along the stationary guide rails 58 until the container 240 reaches the ground level G, thereby disengaging the container retaining device consisting of the hooks 252, 254 and frame members 184, 178. The operator then halts the operating mechanism, rotates the handles 224 of each container coupling device 202 and pulls outward on them to release the latch pieces 226 from engagement with the brackets 234 and to retract the former through the holes 230. At the same time, the operator unhooks the hook portions 210 of the heads 208 from engagement with the upper edge of the holes 230 (Figure 5), thereby disengaging the heads 208 and latch pieces 226 from the brackets 234. The operator then pulls or pushes the container 240 away from the vehicle body 28 and elevator 180, whereupon the vehicle may either resume its journey or hoist and empty another container 240 which is handled in the same manner as has just been described above. Before resuming the journey, however, the vehicle operator operates the hoisting mechanism in the manner previously described so as to cause the elevator 180 to move upward and to swing with the hoisting arms 90 and stub rails 64 into the dotted line position (Figure 2) within the vehicle body 28.

It is understood, of course, that the opposite side of the vehicle body 28 is preferably equipped with a similar elevator and, if desired, two or more such elevators and their hoisting mechanisms may be mounted on each side of the vehicle body 28. If the material is compressible, such as trash or garbage, the vehicle 20 may be provided with additional material-compressing mechanism (not shown) by which the material may be caused to occupy a smaller space within the vehicle body 28 and thus permit the latter to haul a greater load than would be possible without such compression.

Thus by the present invention it is not necessary to haul the containers to the dumping ground or other point of disposal, with the result that the containers are free to be moved back to their filling positions in the factory, store or whatever location they are used. The present invention thus enables a single material pickup vehicle 20 to maintain collection service along regularly scheduled route, for example on certain days of the week or at certain times on such days. The users or subscribers to such service are thereby enabled to plan their operations and schedule the pickup of the material in an efficient and accurate manner. Due to the tapered shapes of the containers 240, they may be nested when empty, for purposes of transportation or storage, thereby economizing on shipping or storage space.

It will be understood that where the term "cable" has been used herein, other flexible members such as chains are also included.

What I claim is:

1. A material loader for use at the upper edge of an upstanding vehicle body comprising a container inverting arm pivotally mounted adjacent the upper edge of the body to swing thereover between outwardly- and inwardly-projecting positions, a cable guide mounted on said arm near the outer end thereof, an elongated container elevator guideway disposed vertically on the vehicle body, a bottomless container elevator disposed adjacent said body in guided engagement with said guideway for travel vertically therealong, a cable winder mounted on the upper part of said body, a cable extending from said cable winder over said cable guide downwardly to said elevator, a material container separably connectible to said elevator, said container elevator guideway including a pair of laterally-spaced substantially parallel vertical guide rails and said elevator including a material container abutment structure disposed approximately in a common vertical plane adjacent said guide rails and extending laterally therebetween in guided engagement therewith said material container having abutment-engaging portions disposed approximately in a common vertical plane in abutting engagement with said abutment structure, a container coupling device on said elevator detachably connecting said container to said elevator, and cable winder actuating mechanism operatively connected to said cable winder for winding the cable thereon to move said elevator upwardly along said guideway and consequently to lift the container coupled thereto upwardly against said arm and thereafter swing said arm and container over said upper edge of said body into an inverted container-emptying position.

2. A material loader for use at the upper edge of an upstanding vehicle body comprising a container inverting arm pivotally mounted adjacent the upper edge of the body to swing thereover between outwardly- and inwardly-projecting positions, a cable guide mounted on said arm near the outer end thereof, an elongated container elevator guideway disposed vertically on the vehicle body, a bottomless container elevator disposed adjacent said body in guided engagement with said guideway for travel vertically therealong, a cable winder mounted on the upper part of said body, a cable extending from said cable winder over said cable guide downwardly to said elevator, a material container separably connectible to said elevator, a container coupling device on said elevator detachably connecting said container to said elevator, cable winder actuating mechanism operatively connected to said cable winder for winding the cable thereon to move said elevator upwardly along said guideway and consequently to lift the container coupled thereto upwardly against said arm and thereafter swing said arm and container over said upper edge of said body into an inverted container-emptying position, and a locking member releasably locking said container to said arm.

3. A material loader for use at the upper edge of an upstanding vehicle body comprising a container inverting arm pivotally mounted adjacent the upper edge of the body to swing thereover between outwardly- and inwardly-projecting positions, a cable guide mounted on said arm near the outer end thereof, a container elevator disposed adjacent said body for travel vertically therealong, a cable winder mounted on the upper part of said body, a cable extending from said cable winder over said cable guide downwardly to said elevator, a material container separably connectible to said elevator, a container coupling device on said elevator detachably connecting said container to said elevator, cable winder actuating mechanism operatively connected to said cable winder for winding the cable thereon to lift the container upwardly against said arm and thereafter swing said arm and container over said upper edge of said body into an inverted container-emptying position, a locking member releasably locking said container to said arm, and means responsive to the swinging of said arm from its outwardly-projecting position toward its inwardly-projecting position for shifting said locking member into its locking position.

4. A material loader for use at the upper edge of an upstanding vehicle body comprising a container inverting arm pivotally mounted adjacent the upper edge of the body to swing thereover between outwardly- and inwardly-projecting positions, a cable guide mounted on said arm near the outer end thereof, a container elevator disposed adjacent said body for travel vertically therealong, a cable winder mounted on the upper part of said body, a cable extending from said cable winder over said cable guide downwardly to said elevator, a material container separably connectible to said elevator, a container coupling device on said elevator detachably connecting said container to said elevator, cable winder actuating mechanism operatively connected to said cable winder for winding the cable thereon to lift the container upwardly against said arm and thereafter swing said arm and container over said upper edge of said body into an inverted container-emptying position, and a locking member releasably locking said container to said arm, said arm having a tubular axle thereon near the outer end thereof, said cable guide comprising a pulley rotatably mounted on said axle, and said locking member being mounted in said tubular axle for motion to and fro therein.

5. A material loader for use at the upper edge of an upstanding vehicle body comprising a container inverting arm pivotally mounted adjacent the upper edge of the body to swing thereover between outwardly- and inwardly-projecting positions, a cable guide mounted on said arm near the outer end thereof, a container elevator disposed adjacent said body for travel vertically therealong, a cable winder mounted on the upper part of said body, a cable extending from said cable winder over said cable guide downwardly to said elevator, a material container separably connectible to said elevator, a container coupling device on said elevator detachably connecting said container to said elevator, cable winder actuating mechanism operatively connected to said cable winder for winding the cable thereon to lift the container upwardly against said arm and thereafter swing said arm and container over said upper edge of said body into an inverted container-emptying position, a locking member releasably locking said container to said arm, and means responsive to the swinging of said arm from its outwardly-projecting position toward its inwardly-projecting position for shifting said locking member into its locking position, said arm having a tubular axle thereon near the outer end thereof, said cable guide comprising a pulley rotatably mounted on said axle, and said locking member being mounted in said tubular axle for motion to and fro therein.

6. A material loader for use at the upper edge of an upstanding vehicle body comprising a container inverting arm pivotally mounted adjacent the upper edge of the body to swing thereover between outwardly- and inwardly-projecting positions, a cable guide mounted on said arm near the outer end thereof, an elongated container elevator guideway disposed vertically on the vehicle body, a bottomless container elevator disposed adjacent said body in guided engagement with said guideway for travel vertically therealong, a cable winder mounted on the upper part of said body, a cable extending from said cable winder over said cable guide downwardly to said elevator, a material container separably connectible to said elevator, said container elevator guideway including a pair of laterally-spaced substantially parallel vertical guide rails and said elevator including a material container abutment structure disposed approximately in a common vertical plane adjacent said guide rails and extending laterally therebetween in guided engagement therewith said material container having abutment-engaging portions disposed approximately in a common vertical plane in abutting engagement with said abutment structure, a container coupling device on said elevator detachably connecting said container to said elevator, and cable winder actuating mechanism operatively connected to said cable winder for winding the cable thereon to move said elevator upwardly along said guideway and consequently to lift the container coupled thereto upwardly against said arm and thereafter swing said arm and container over said upper edge of said body into an inverted container-emptying position, said container having a coupling receiver thereon and said coupling device including a latch releasably engageable with said receiver.

7. A material loader for use at the upper edge of an upstanding vehicle body comprising a container inverting arm pivotally mounted adjacent the upper edge of the body to swing thereover between outwardly- and inwardly-projecting positions, a cable guide mounted on said arm near the outer end thereof, an elongated container elevator guideway disposed vertically on the vehicle body, a bottomless container elevator disposed adjacent said body in guided engagement with said guideway for travel vertically therealong, a cable winder mounted on the upper part of said body, a cable extending from said cable winder over said cable guide downwardly to said elevator, a material container separably connectible to said elevator, said container elevator guideway including a pair of laterally-spaced substantially parallel vertical guide rails and said elevator including a material container abutment structure disposed approximately in a common vertical plane adjacent said guide rails and extending laterally therebetween in guided engagement therewith, said material container having abutment-engaging portions disposed approximately in a common vertical plane in abutting engagement with said abutment structure, a container coupling device on said elevator detachably connecting said container to said elevator, and cable winder actuating mechanism operatively connected to said cable winder for winding the cable thereon to move said elevator upwardly along said guideway and consequently to lift the container coupled thereto upwardly against said arm and thereafter swing said arm and container over said upper edge of said body into an inverted container-emptying position, said elevator including a cable-attachment member pivotally mounted thereon and swingable relatively thereto, said cable being connected to said cable-attachment member.

8. A material loader for use at the upper edge of an upstanding vehicle body comprising a container inverting arm pivotally mounted adjacent the upper edge of the body to swing thereover between outwardly- and inwardly-projecting positions, a cable guide mounted on said arm near the outer end thereof, an elongated container elevator guideway disposed vertically on the vehicle body, a container elevator disposed adjacent said body in guided engagement with said guideway for travel vertically therealong, a cable winder mounted on the upper part of said body, a cable extending from said cable winder over said cable guide downwardly to said elevator, a material container separably connectible to said elevator, a container coupling device on said elevator detachably connecting said container to said elevator, and cable winder actuating mechanism operatively connected to said cable winder for winding the cable thereon to move said elevator upwardly along said guideway and consequently to lift the container coupled thereto upwardly against said arm and thereafter swing said arm and container over said upper edge of said body into an inverted container-emptying position, said elevator including a cable-attachment member pivotally mounted thereon and connected to said cable, said coupling device being mounted on said member.

9. A material loader for use at the upper edge of an upstanding vehicle body comprising a container inverting arm pivotally mounted adjacent the upper edge of the body to swing thereover between outwardly- and inwardly-projecting positions, a cable guide mounted on said arm near the outer end thereof, a container elevator disposed adjacent said body for travel vertically therealong, a cable winder mounted on the upper part of said body, a cable extending from said cable winder over said cable guide downwardly to said elevator, a material container separably connectible to said elevator, a container coupling device on said elevator detachably connecting said container to said elevator, and cable winder actuating mechanism operatively connected to said cable winder for winding the cable thereon to lift the container upwardly against said arm and thereafter swing said arm and container over said upper edge of said body into an inverted container-emptying position, said elevator including a cable-attachment member pivotally mounted thereon and connected to said cable, said coupling device being pivotally mounted on said member and depending therefrom.

10. A material loader for use at the upper edge of an upstanding vehicle body comprising a container inverting arm pivotally mounted adjacent the upper edge of the body to swing thereover between outwardly- and inwardly-projecting positions, a cable guide mounted on said arm near the outer end thereof, a container elevator disposed adjacent said body for travel vertically therealong, a cable winder mounted on the upper part of said body, a cable extending from said cable winder over said cable guide downwardly to said elevator, a material container separably connectible to said elevator, a container coupling device on said elevator detachably connecting said container to said elevator, and cable winder actuating mechanism operatively connected to said cable winder for winding the cable thereon to lift the container upwardly against said arm and thereafter swing said arm and container over said upper edge of said body into an inverted container-emptying position, said elevator including a cable-attachment member pivotally mounted thereon and connected to said cable, said container having a coupling receiver thereon and said coupling device including a latch releasably engageable with said receiver.

11. A material loader for use at the upper edge of an upstanding vehicle body comprising a container inverting arm pivotally mounted adjacent the upper edge of the body to swing thereover between outwardly- and inwardly-projecting positions, a cable guide mounted on said arm near the outer end thereof, a container elevator disposed adjacent said body for travel vertically therealong, a cable winder mounted on the upper part of said body, a cable extending from said cable winder over said cable guide downwardly to said elevator, a material container separably connectible to said elevator, a container coupling device on said elevator detachably connecting said container to said elevator, and cable winder actuating mechanism operatively connected to said cable winder for winding the cable thereon to lift the container upwardly against said arm and thereafter swing said arm and container over said upper edge of said body into an inverted container-emptying position, said elevator including a cable-attachment member pivotally mounted thereon and connected to said cable, said coupling device being mounted on said member, said container having a coupling receiver thereon and said coupling device including a latch releasably engageable with said receiver.

12. A material loader for use at the upper edge of an upstanding vehicle body comprising a container inverting arm pivotally mounted adjacent the upper edge of the body to swing thereover between outwardly- and inwardly-projecting positions, a cable guide mounted on said arm near the outer end thereof, a container elevator disposed adjacent said body for travel vertically therealong, a cable winder mounted on the upper part of said body, a cable extending from said cable winder over said cable guide downwardly to said elevator, a material container separably connectible to said elevator, a container coupling device on said elevator detachably connecting said container to said elevator, and cable winder actuating mechanism operatively connected to said cable winder for winding the cable thereon to lift the container upwardly against said arm and thereafter swing said arm and container over said upper edge of said body into an inverted container-emptying position, said elevator including a cable-attachment member pivotally mounted thereon and connected to said cable, said coupling device being pivotally mounted on said member and depending therefrom, said container having a coupling receiver thereon and said coupling device including a latch releasably engageable with said receiver.

13. A material loader for use at the upper edge of an upstanding vehicle body comprising a container inverting arm pivotally mounted adjacent the upper edge of the body to swing thereover between outwardly- and inwardly-projecting positions, a cable guide mounted on said arm near the outer end thereof, an elongated container elevator guideway disposed vertically on the vehicle body, a container elevator disposed adjacent said body in guided engagement with said guideway for travel vertically therealong, a cable winder mounted on the upper part of said body, a cable extending from said cable winder over said cable guide downwardly to said elevator, a material container separably connectible to said elevator, a container coupling device on said elevator detachably connecting said container to said elevator, and cable winder actuating mechanism operatively connected to said cable winder for winding the cable thereon to move said elevator upwardly along said guideway and consequently to lift the container coupled thereto upwardly against said arm and thereafter swing said arm and container over said upper edge of said body into an inverted container-emptying position, and a container retaining device on said container including releasable interlocking connectors spaced apart from said coupling device.

14. A material loader for use at the upper edge of an upstanding vehicle body comprising a container inverting arm pivotally mounted adjacent the inner edge of the body to swing thereover between outwardly- and inwardly-projecting positions, a cable guide mounted on said arm near the outer end thereof, an elongated container elevator guideway disposed vertically on the vehicle body, a container elevator disposed adjacent said body in guided engagement with said guideway for travel vertically therealong, a cable winder mounted on the upper part of said body, a cable extending from said cable winder over said cable guide downwardly to said elevator, a material container separably connectible to said elevator, a container coupling device on said elevator detachably connecting said container to said elevator, and cable winder actuating mechanism operatively connected to said cable winder for winding the cable thereon to move said elevator upwardly along said guideway and consequently to lift the container coupled thereto upwardly against said arm and thereafter swing said arm and container over said upper edge of said body into an inverted container-emptying position, and a container retaining device on one side of said container including releasable interlocking connectors spaced apart from said coupling device.

15. A material loader for use at the upper edge of an upstanding vehicle body comprising a container inverting arm pivotally mounted adjacent the upper edge of the body to swing thereover between outwardly- and inwardly-projecting positions, a cable guide mounted on said arm near the outer end thereof, an elongated container elevator guideway disposed vertically on the vehicle body, a bottomless container elevator disposed adjacent said body in guided engagement with said guideway for travel vertically therealong, a cable winder mounted on the upper part of said body, a cable extending from said cable winder over said cable guide downwardly to said elevator, a material container separably connectible to said elevator, a container coupling device on said elevator detachably connecting said container to said elevator, cable winder actuating mechanism operatively connected to said cable winder for winding the cable thereon to move said elevator upwardly along said guideway and consequently to lift the container coupled thereto upwardly against said arm and thereafter swing said arm and container over said upper edge of said body into an inverted container-emptying position, and a container retaining device on said container and elevator including hooks on said container and hook-receiving portions on said elevator releasably engageable with said hooks.

16. A container-inverting device for use with a vehicle loader comprising a bracket adapted to be attached to the vehicle, an arm pivotally mounted on said bracket for swinging motion relatively thereto, a tubular cable guide pulley axle mounted on said arm remote from said bracket, a cable guide pulley rotatably mounted on said axle, a container locking member reciprocably mounted in said tubular axle, and means for reciprocating said locking member between its unlocked and locked positions.

17. A container-inverting device for use with a vehicle loader comprising a bracket adapted to be attached to the vehicle, an arm pivotally mounted on said bracket for swinging motion relatively thereto, a cable guide pulley rotatably mounted on said arm remote from said bracket, a container locking member movably mounted on said arm, and means responsive to the swinging of said arm relatively to said bracket for moving said locking member between its unlocked and locked positions.

18. A detachable elevator and material container installation for use with a vehicle body having an upwardly-extending elevator guideway thereon, said installation comprising a bottomless container elevator having a bottomless frame with guideway-engaging elements thereon disposed in relatively movable guided engagement with said guideway and also having container hoisting members with container hoisting connectors thereon; a box-shaped container structure having front and rear and end walls and a bottom wall, and hoisting connector attachment members mounted on said end walls; and interlocking separable container-to-elevator retaining devices secured to and extending between said rear container wall and said elevator frame respectively.

19. A detachable elevator and material container installation for use with a vehicle body having an upwardly-extending elevator guideway thereon, said installation comprising a bottomless container elevator having a bottomless frame with guideway-engaging elements thereon disposed in relatively movable guided engagement with said guideway and also having container hoisting members with container hoisting connectors thereon; a box-shaped container structure having front and rear and end walls and a bottom wall, and hoisting connector attachment members mounted on said end walls; and interlocking separable container-to-elevator retaining devices secured to and extending between said rear container wall and said elevator frame respectively, at least three of said container side walls tapering in width downwardly toward said bottom wall whereby said container structure converges from top to bottom to effect nested stacking of empty containers.

References Cited in the file of this patent

UNITED STATES PATENTS

| | | |
|---|---|---|
| 665,574 | Morris | Jan. 8, 1901 |
| 1,763,499 | Bolger | June 10, 1930 |
| 2,522,441 | Galloway et al. | Sept. 12, 1950 |

FOREIGN PATENTS

| | | |
|---|---|---|
| 514,423 | Great Britain | Nov. 7, 1939 |